United States Patent
Teague et al.

(10) Patent No.: US 8,570,831 B2
(45) Date of Patent: Oct. 29, 2013

(54) WAVEFIELD EXTRAPOLATION MODELING FOR INTERNAL MULTIPLE PREDICTION

(75) Inventors: Alan G. Teague, Houston, TX (US); Zhiming Wu, Katy, TX (US); Philip Kitchenside, Kent (GB); Milton A. Walz, Deer Park, TX (US)

(73) Assignee: WesternGeco L.L.C., Houston, TX (US)

( * ) Notice: Subject to any disclaimer, the term of this patent is extended or adjusted under 35 U.S.C. 154(b) by 759 days.

(21) Appl. No.: 12/611,763

(22) Filed: Nov. 3, 2009

(65) Prior Publication Data

US 2010/0135114 A1 Jun. 3, 2010

Related U.S. Application Data

(60) Provisional application No. 61/119,640, filed on Dec. 3, 2008.

(51) Int. Cl.
*G01V 1/38* (2006.01)

(52) U.S. Cl.
USPC .............................. 367/24; 367/38

(58) Field of Classification Search
USPC ....................... 367/24, 38, 73; 702/14, 16, 17
See application file for complete search history.

(56) References Cited

U.S. PATENT DOCUMENTS

| 6,154,705 | A | * | 11/2000 | McCormack et al. | .......... 702/17 |
| 7,286,938 | B2 | | 10/2007 | Amundsen et al. | |
| 7,453,765 | B2 | | 11/2008 | Ikelle | |

OTHER PUBLICATIONS

Pica et al., Wave equation based internal multiple modeling in 3D, SEG Las Vegas Annual Meeting, 2008, pp. 2476-2480.*
Kabir, et al., 3D Wavefield Extrapolation Based Demultiple in Ormen Lange, SEG Annual Meeting, Oct. 15, 2004.
Pica, et al., 3D Surface-Related Multiple Modeling, Principles and Results, SEG Annual Meeting 2005.
Pica, et al., Wave Equation Based Internal Multiple Modeling in 3D, SEG Annual Meeting 2008.
Stork, et al., Predicting and Removing Complex 3D Surface Multiples with WEM Modeling-an Alternative to 3D SRME for Wide Azimuth Surveys?, SEG Annual Meeting 2006.
Wendell Wiggins, Multiple Attenuation by Explicit Wave Extrapolation to an Interpreted Horizon, The Leading Edge, Jan. 1999, pp. 46-54.
PCT Search Report, dated Jul. 16, 2010, Application No. PCT/US2009/066431.

* cited by examiner

*Primary Examiner* — Isam Alsomiri
*Assistant Examiner* — Daniel L Murphy

(57) ABSTRACT

Methods for attenuating multiple reflections in seismic data by predicting the multiples using wavefield extrapolation modeling, which uses one-way wavefield propagation in both the up and down directions to predict internal multiples up to a specified order.

19 Claims, 13 Drawing Sheets

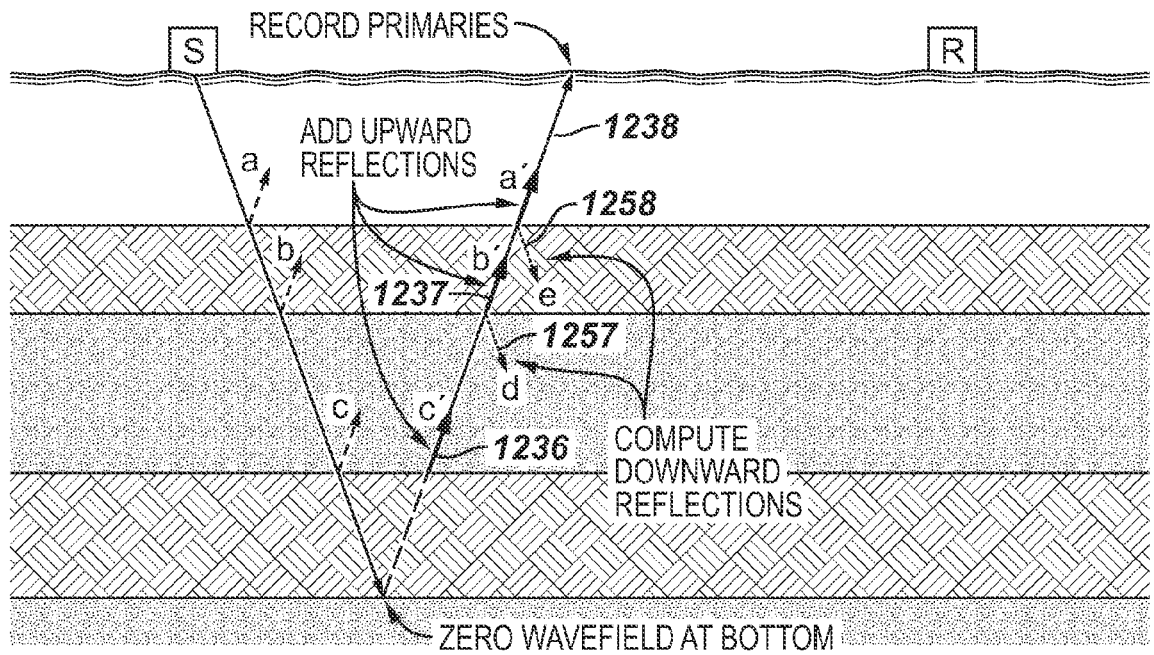
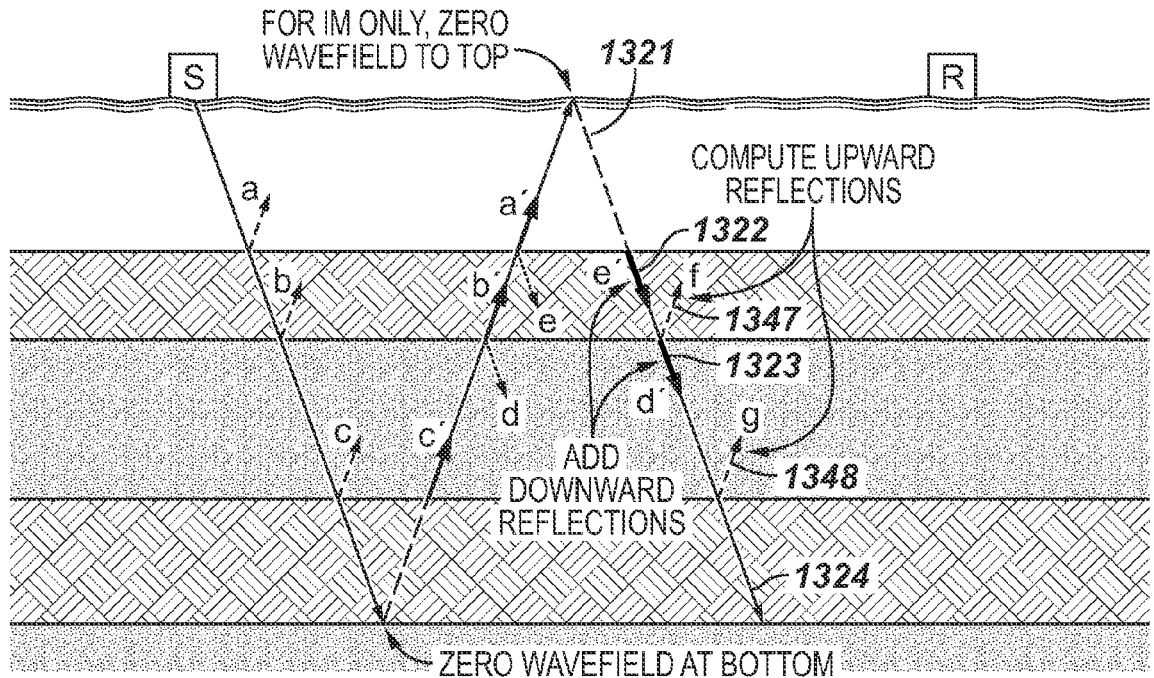

WAVEFIELD EXTRAPOLATION MODELING FOR INTERNAL MULTIPLE PREDICTION

CROSS-REFERENCE TO RELATED APPLICATIONS

The present application claims priority under 35 U.S.C. §119(e) to U.S. Provisional Application Ser. No. 61/119,640 filed on Dec. 3, 2008, with the same title and by the same inventors.

BACKGROUND

1. Field of the Invention

Embodiments of the present invention generally relate to seismic surveying and, more particularly, to a method for attenuating multiples in seismic data.

2. Description of the Related Art

The following descriptions and examples do not constitute an admission as prior art by virtue of their inclusion within this section.

Seismic surveying is a method for determining the structure of subterranean formations in the earth. Seismic surveying may typically utilize seismic energy sources which generate seismic waves and seismic receivers which detect seismic waves. The seismic waves may propagate into the formations in the earth, where a portion of the waves may reflect from interfaces between subterranean formations. The seismic receivers may detect the reflected seismic waves and convert the reflected waves into representative electrical data. The seismic data may be transmitted by electrical, optical, radio or other means to devices which record the data. Through analysis of the recorded seismic data (or seismograms), the shape, position and composition of the subterranean formations may be determined. Such analysis may indicate the presence or absence of probable locations of hydrocarbon deposits or other valuable substances.

Depending on the location where a survey takes place, there are surveys in sea, on land or in transition zones. Marine seismic surveying is a method for determining the structure of subterranean formations underlying bodies of water. Marine seismic surveying may typically utilize seismic energy sources and seismic receivers located in the water which may be either towed behind a vessel or positioned on the water bottom from a vessel. The energy source may typically be an explosive device or compressed air system which generates seismic energy, which then propagates as seismic waves through the body of water and into the earth formations below the bottom of the water. As the seismic waves strike interfaces between subterranean formations, a portion of the seismic waves may reflect back through the earth and water to the seismic receivers, to be detected, transmitted, and recorded. The seismic receivers typically used in marine seismic surveying may be pressure sensors, such as hydrophones. Additionally, motion sensors, such as accelerometers, may be used. Both the sources and receivers may be strategically repositioned to cover the survey area.

Land seismic surveying is done on land. The energy sources are typically vibratory sources (vibrators). The vibrators produce a pressure signal that propagates through the earth into the various subsurface layers. Here elastic waves are formed through interaction with the geologic structure in the subsurface layers. Elastic waves are characterized by a change in local stress in the subsurface layers and a particle displacement, which is essentially in the same plane as the wavefront. Acoustic and elastic waves are also known as pressure and shear waves. Acoustic and elastic waves are collectively referred to as the seismic wavefield.

A reflected wavefield may consist of both primary reflections and multiple reflections. Primary reflections may be defined as seismic waves which have reflected only once, from an interface between subterranean formations, before being detected by a seismic receiver. Primary reflections contain the desired information about the subterranean formations which is the goal of marine seismic surveying. Multiple reflections, or multiples, may be defined as seismic waves which have reflected more than once before being detected by a seismic receiver.

FIG. 1 illustrates two types of multiples: internal multiple 110 and a surface multiple 120. A "surface multiple" is herein defined as any seismic event that is generated by at least two upward reflections and at least one downward reflection from the free surface boundary. The free surface boundary is typically the sea surface in marine environment, or earth surface in land surveys.

Another type of multiples is an "internal multiple", which is herein defined as any seismic event that is generated by at least two upward reflections and at least one downward reflection from a boundary below the free surface with no downward reflection from the free surface. The internal multiples comprise multiple reflections between reflectors and media within the earth subsurface, whose physical properties are unknown and usually need to be determined by the survey.

In the context of seismic surveying, multiple attenuation is a pre-stack inversion of a recorded wavefield, which aims at removing the energy associated with multiple reflections. Theoretically, multiple attenuation can be pursued in a totally data-driven manner by evaluating equations which involve continuous summations over the directions of space.

Surface Multiples

There are several methods available to attenuate surface related multiples. Wavefield extrapolation techniques that estimate surface multiples have been described in many publications. Wiggins (1999) summarized the 2D technique that subtracts forward extrapolated shot gathers from backward extrapolated shot gathers. In this case, the primaries of the forward extrapolated shots matched the first order surface multiples of the backward extrapolated shots. Subtracting these data sets and forward extrapolating the results removed the first order surface multiples from the input shot gathers.

Kabir et. al. (2004) extended Wiggins' method to 3D and used it to attenuate water-bottom multiples and peg-legs. But this method required receiver line interpolation to ensure adequate crossline data coverage.

Pica et. al. (2005) extended the 3D wavefield extrapolation technique to essentially de-migrate a depth image using a given velocity field to compute primaries and surface multiples. The first de-migration process resulted in an estimate of the primaries, and subsequent de-migrations computed successively higher orders of surface multiples. They indicated that a recorded shot can be used in place of the computed primary wavefield.

Stork et. al. (2006) used a similar de-migration scheme to compute primaries and surface multiples. This method is called Wavefield Extrapolation Multiple Modeling (WEMM), and performs the following four steps. FIGS. 6-9 illustrate the steps and a four-layer model 600, which has three interfaces 611, 612 and 613, and a bottom 614.

Step 1: Using wavefield extrapolation, forward propagate a point source 620 at the source location (S, considered the surface) downward through the given reflectivity and velocity models 600, and compute and store upward reflection information (a 628, b 627 and c 626 in FIG. 6). Stop the propagation at a specified depth (bottom 614).

Step 2: Forward propagate a 2D zero energy wavefield from the bottom 614 of the given reflectivity and velocity models 600 to the surface 610, and accumulate all upward reflection information previously computed (c' 636, b' 637 and a' 638 in FIG. 7). Save the 2D wavefield at the surface 610. This wavefield consists of primary reflections generated from one upward bounce off of the modeled reflectors 611, 612 and 613.

Step 3: Forward propagate the recorded 2D wavefield at the surface downward through the given reflectivity and velocity models 600, and again compute and store upward reflection information (d 648, e 647 and f 646 in FIG. 8). Stop the propagation at the bottom 614.

Step 4: Forward propagate a 2D zero energy wavefield from the bottom 614 of the given reflectivity and velocity models 600 to the surface 610, and accumulate all upward reflection information previously computed (d' 658, e' 657 and f' 656 in FIG. 9). Save the wavefield at the surface 610. This wavefield consists of first order surface multiples generated from two upward reflections off of the modeled reflectors and one downward bounce off of the free surface 610.

Higher orders of surface multiples can be computed by increasing the number of propagations performed. Surface multiples of order 1 to N−1 are computed from N propagations.

Internal Multiple Prediction

Pica and Delmas (2008) used a wavefield extrapolation method similar to the surface multiple prediction method described by Pica et. al. (2005) to compute 3D internal multiples from marine data. Their method consists of four separate extrapolation steps.

Step 1: Back propagate recorded shots to an arbitrary depth.

Step 2: Upward propagate the back propagated shot through the migrated image to generate a first set of secondary sources at reflectors.

Step 3: Propagate the wavefield generated from first set of secondary sources downward through migrated image, building a second set of secondary sources at the reflectors.

Step 4: Propagate the wavefield generated from the second set of secondary sources upward through migrated image, resulting in an internal multiple model.

This method of internal multiple modeling inputs recorded shots as the initial wavefield, and adds to all events in the shot of first order internal multiple whose generating horizon lies above the arbitrary depth established in Step 1.

As described above, the prior art methods have some success in predicting and attenuating multiples. But it is still not satisfactory for many situations. Internal multiples are still difficult and costly to remove from seismic data, especially as the dimension for the problem increases. It is desirable to have methods to effectively attenuate various multiples, especially internal multiples.

BIBLIOGRAPHY

Kabir, N., R. Abma and G Xia, 2004, 3D Wavefield Extrapolation based demultiple in Ormen Lange, 74th Annual International Meeting: SEG, Expanded Abstracts, 1245-1248.

Pica, A, G. Poulain, B. David, M. Megesan, S. Baldock, T. Weisser, P. Hugonnet and P. Herrmann, 2005, 3D surface-related multiple modeling, The Leading Edge, 292-296.

Pica, A. and L. Delmas, 2008, Wave equation based internal multiple modeling in 3D, 80th Annual International Meeting: SEG, Expanded Abstracts, 2476-2480.

Stork, C., J. Kapoor, W. Zhao, B. Dragoset and K. Dingwall, 2006, Predicting and removing complex 3D surface multiples with WEM modeling—an alternative to 3D SRME for wide azimuth surveys, 76th Annual International Meeting: SEG, Expanded Abstracts, 2679-2683.

Wiggins, W., 1999, Multiple attenuation by explicit wave extrapolation to an interpreted horizon, The Leading Edge, 46-54.

SUMMARY

Described herein are implementations of various techniques for a method for attenuating internal multiple reflections using wavefield extrapolation modeling. In one embodiment, the method starts with a multi-layer earth model, then carries out several steps, including: (a) propagating a wavefield downward until reaching the bottom of the earth model, computing and preserving information about any upward reflecting energies at each layer boundary; (b) propagating the wavefield upward until reaching the surface, computing and preserving information about any downward reflecting energies at each layer boundary; and (c) repeating step (a) and (b) at least once and accumulating upward energies towards a receiver as a prediction of multiples. Other embodiments may include other steps.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

FIG. 6 shows a first downward propagation of point source. FIG. 7 shows a first upward propagation of zero wavefield plane. The wavefield at the surface consists of primaries only. FIG. 8 shows a second downward propagation of the 2D wavefield at the surface. FIG. 9 shows a second upward propagation of zeroed wavefield plane. The wavefield at the surface (R) consists of first order surface multiples only.

FIG. 12 illustrates a second step of the embodiment. At the bottom of the downward propagation, the wavefield is zeroed. During the first upward propagation, the previously recorded upward reflections (a, b and c) are added to the upward propagating wavefield (c', b' and a'), and the downward reflecting energy is computed and recorded (d and e). The final wavefield recorded at the surface contains only primary reflections.

FIG. 13 illustrates a third step of the embodiment. At the surface, the wavefield is zeroed. During the second downward propagation, the upward reflecting energy is recorded (f and g) and the previously recorded downward reflections (e' and d') are added to the downward propagating wavefield

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs generally describe one or more implementations of various techniques directed to a method for predicting multiples, especially internal multiples and use the predicted multiples to eventually attenuate such multiples from seismic data.

One embodiment of the current invention is Wavefield Extrapolation Modeling for Internal Multiple Prediction (WEM IMP), which is a model-based method that uses one-way wavefield propagation in both the up and down directions to predict internal multiples up to a specified order. The WEM IMP algorithm is a modification of an existing Wavefield Extrapolation Multiple Modeling (WEMM) algorithm that computes surface multiples. The WEM IMP method can also compute surface multiples and combinations of surface and internal multiples.

Figure 1:
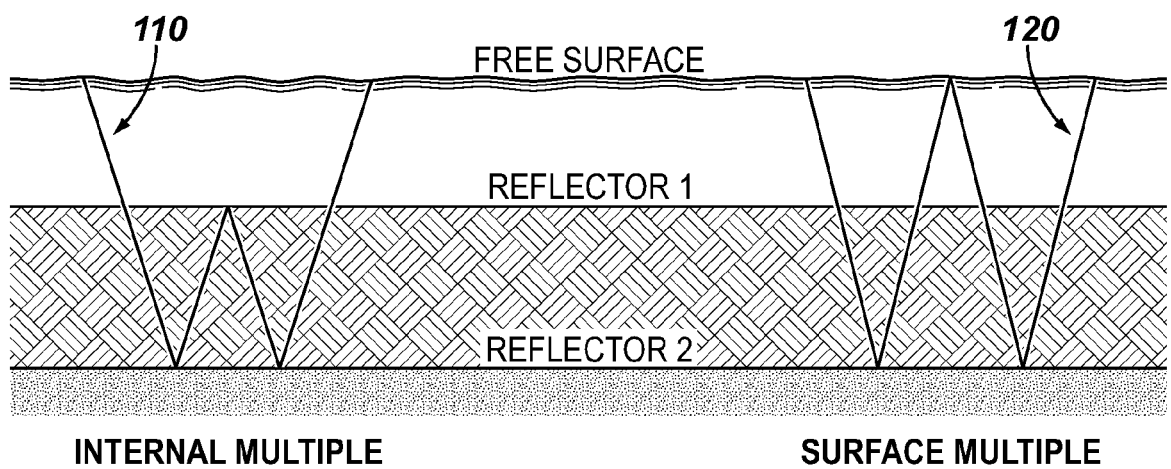
FIG. 1 illustrates a diagrammatic view of an internal multiple and a surface multiple.
Figure 2:
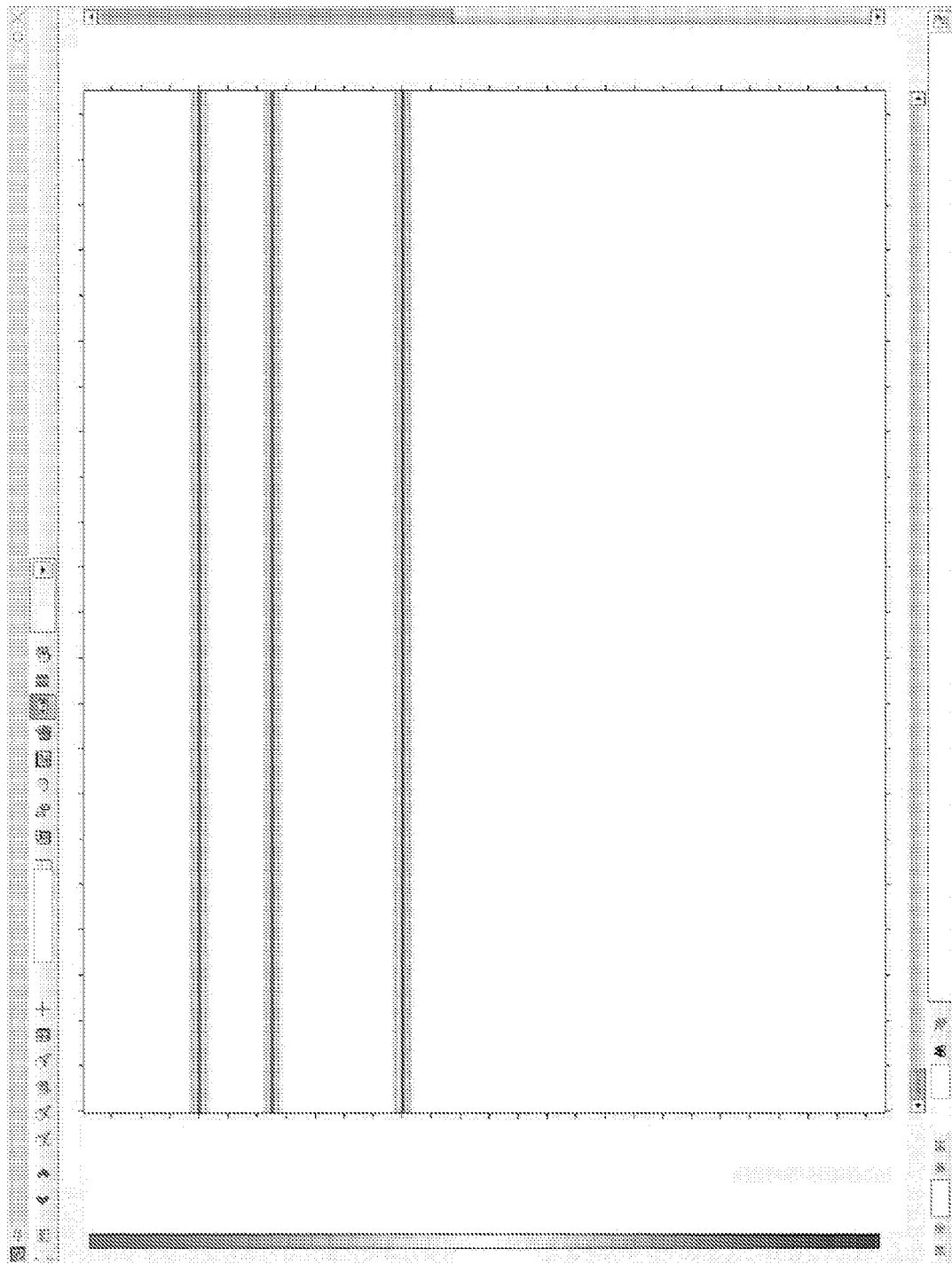
FIG. 2 illustrates center lines of a simple 3D reflectivity model consisting of 3 events within a constant velocity field.
Figure 3:
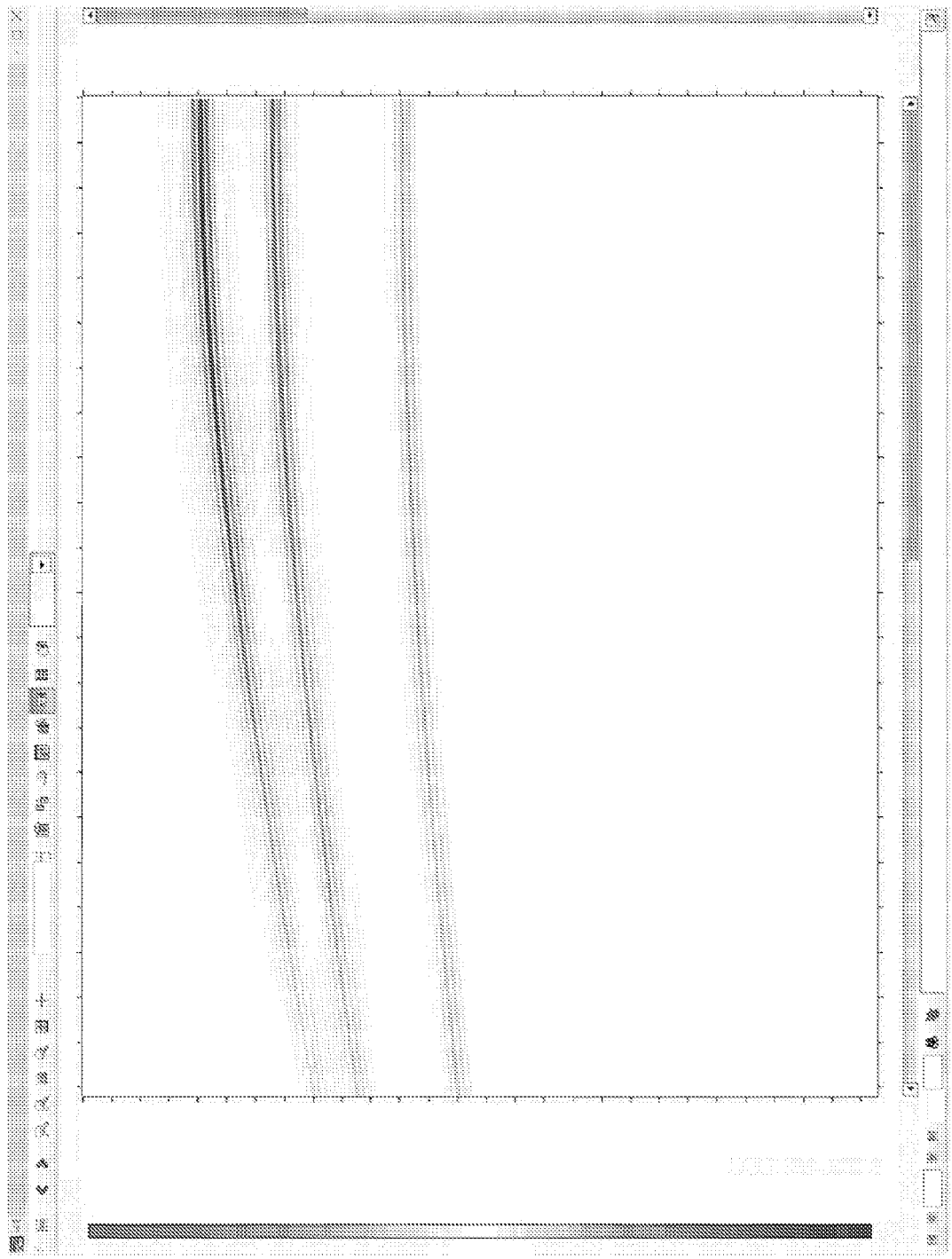
FIG. 3 illustrates primaries computed by an embodiment of the current invention (WEM IMP) by propagating a wavefield through the reflectivity model and velocity model from FIG. 2 (first down/up propagation).
Figure 10:
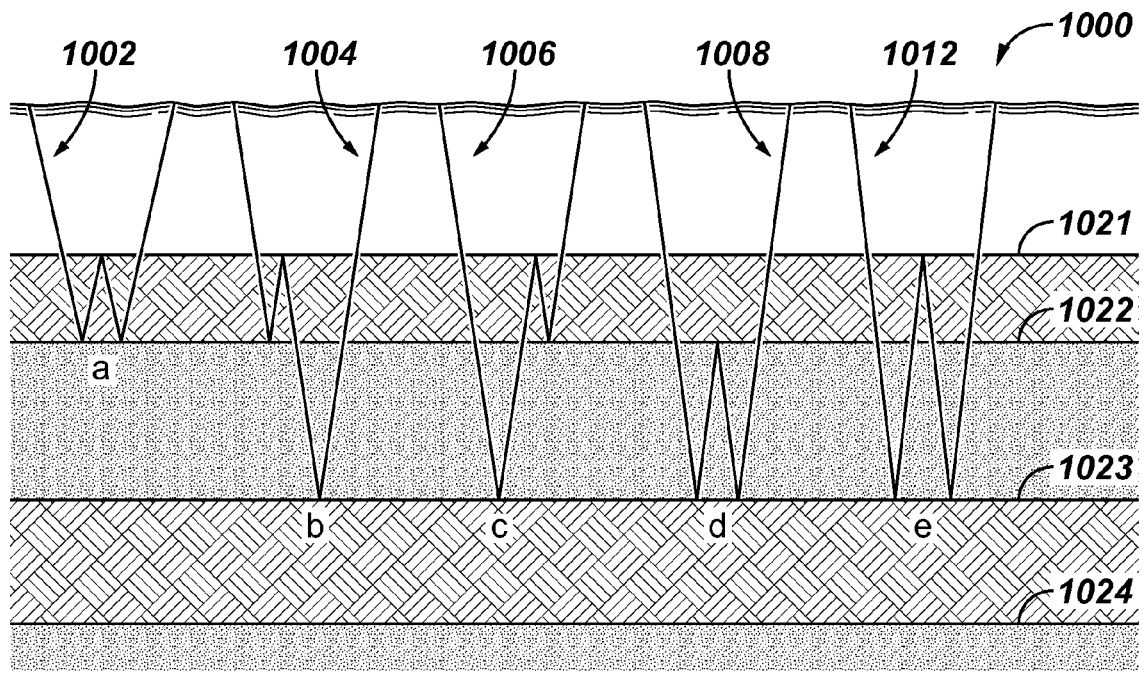
FIG. 10 illustrates raypaths of all possible internal multiples for a simple 4 layer synthetic which is used as a model to illustrate an embodiment of the current invention.

The WEM IMP algorithm uses a reflectivity model and a velocity model. It does not require any input data. A hypothetical source wavefield is propagated into the earth model. The velocity model determines the velocity of the waves and the reflectivity model determines where the reflections occur and how much energy is reflected. The reflected energy is ultimately propagated back to the surface where it is recorded as seismic data. FIG. 2 shows a simple constant velocity reflectivity model. It corresponds to a model as shown in FIG. 10. WEM IMP propagates energy through the reflectivity and velocity models 1000 to compute estimates of the primaries as illustrated in FIG. 3. Additional propagations of the resulting primary wavefield yield increasing orders of multiples as illustrated in FIGS. 4 and 5.

FIG. 10 shows a simple four layer geologic model 1000 and all possible first order internal multiples that can occur. All of these multiples are computed by WEM IMP without the need to know which horizons generated the internal multiple (i.e. produced the downward reflections).

The reflections being produced by multiplying the wavefield at a certain spatial location by the reflectivity at the same spatial location can be obtained from the reflectivity model (e.g. the cubes). The reflectivity model may be expressed in a collection of an x-y-z cube of grid points. Where reflections occur, the values at the grid points will be non-zero. At locations where there are no reflectors the values will be zero. So once the reflectivity cube is given in the model, the locations of individual reflectors are immaterial.

Figure 4:
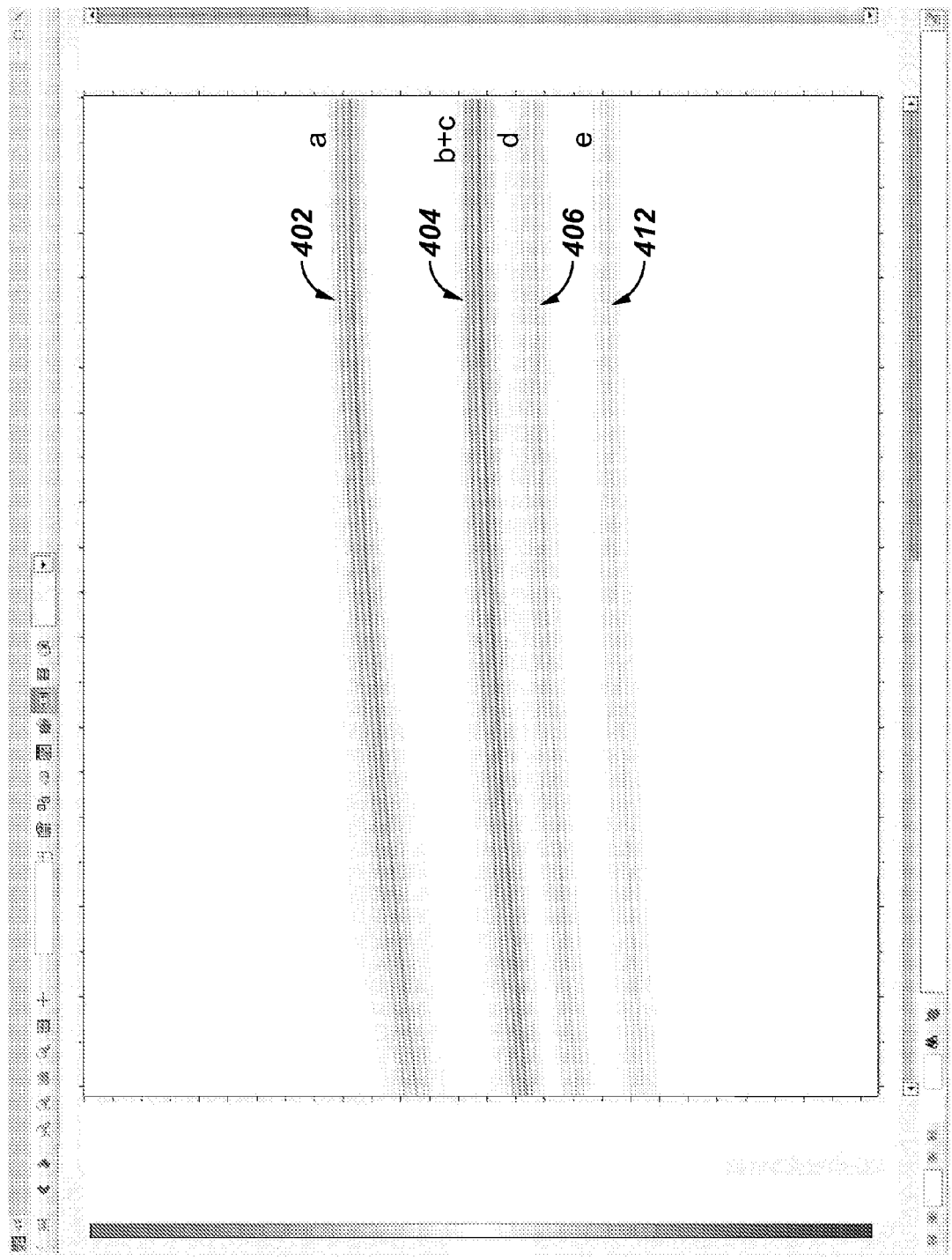
FIG. 4 illustrates first order internal multiples computed by a WEM IMP method by propagating the estimated primary wavefield through the reflectivity and velocity models (second down/up propagation). The raypaths of these multiples are shown in FIG. 10.
Figure 5:
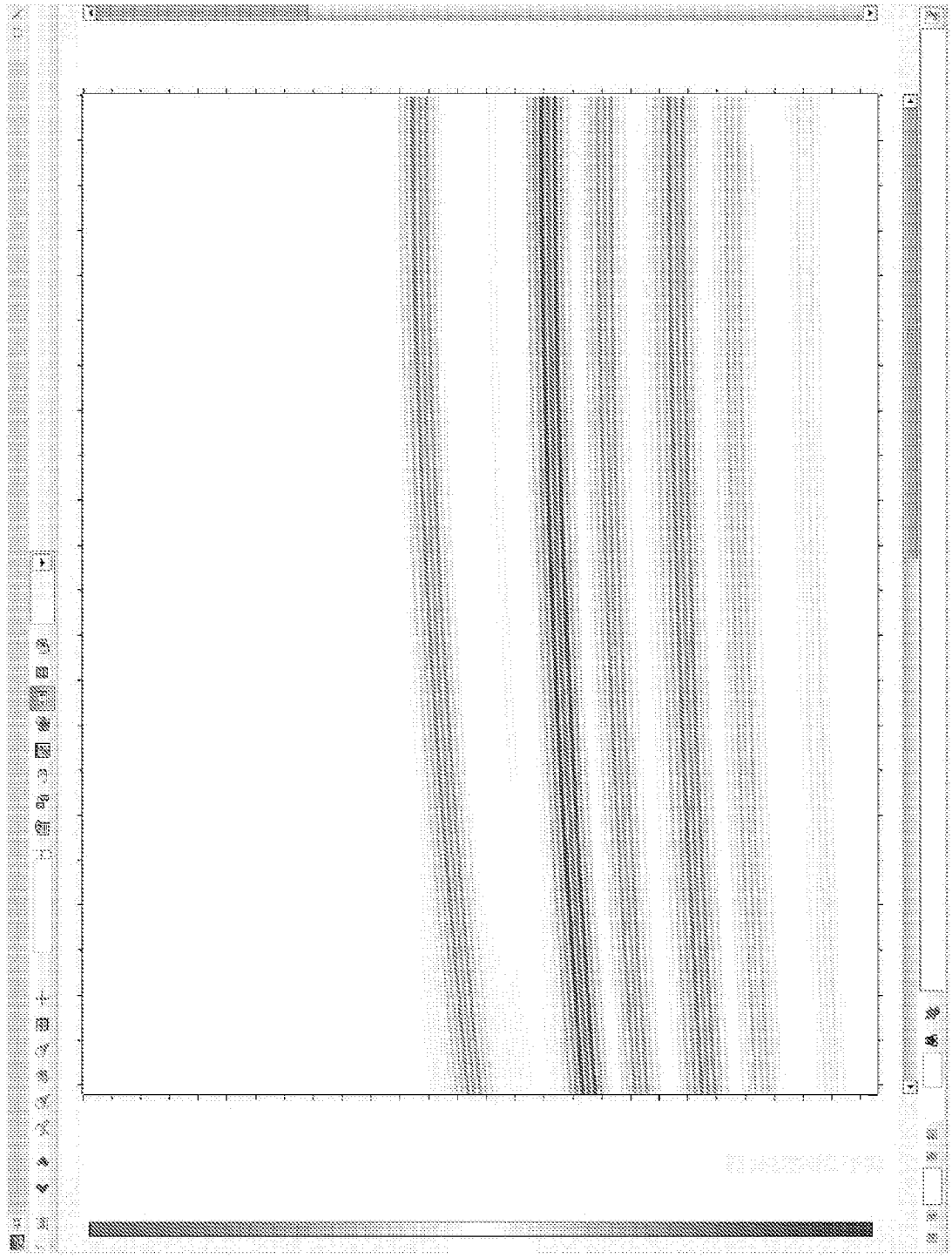
FIG. 5 illustrates second order internal multiples computed by a WEM IMP method by propagating the estimated first order internal multiple wavefield through the reflectivity and velocity models (third down/up propagation).
Figure 6:
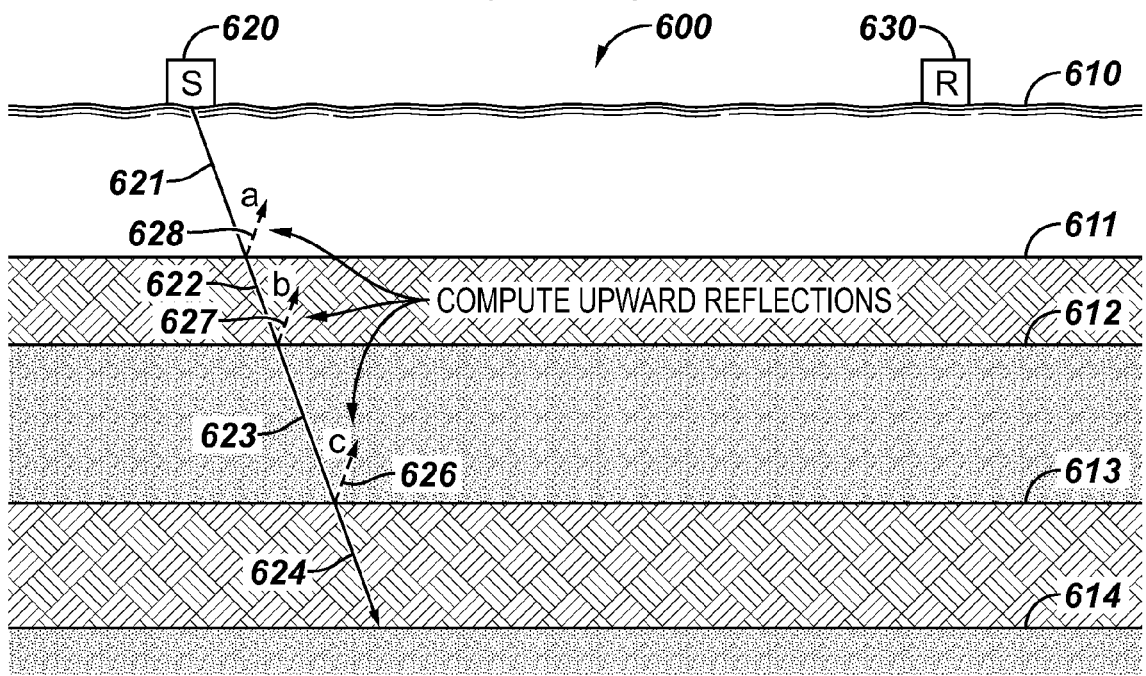
FIGS. 6-9 illustrate steps in a prior art method called Wavefield Extrapolation Multiples Modeling (WEMM).
Figure 7:
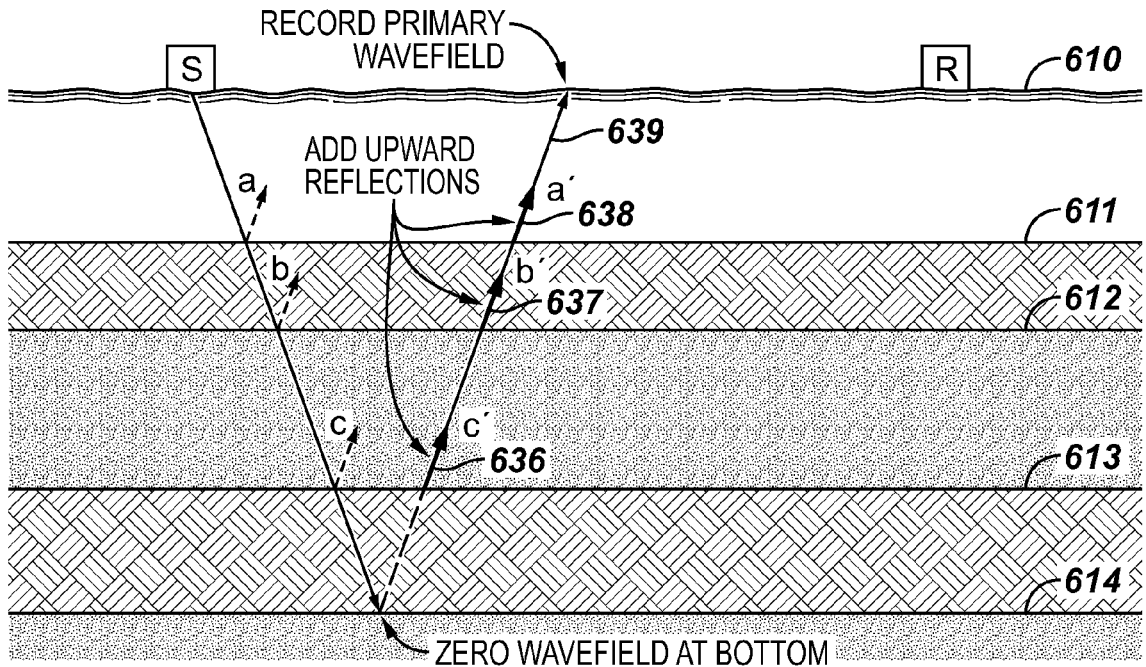
Figure 8:
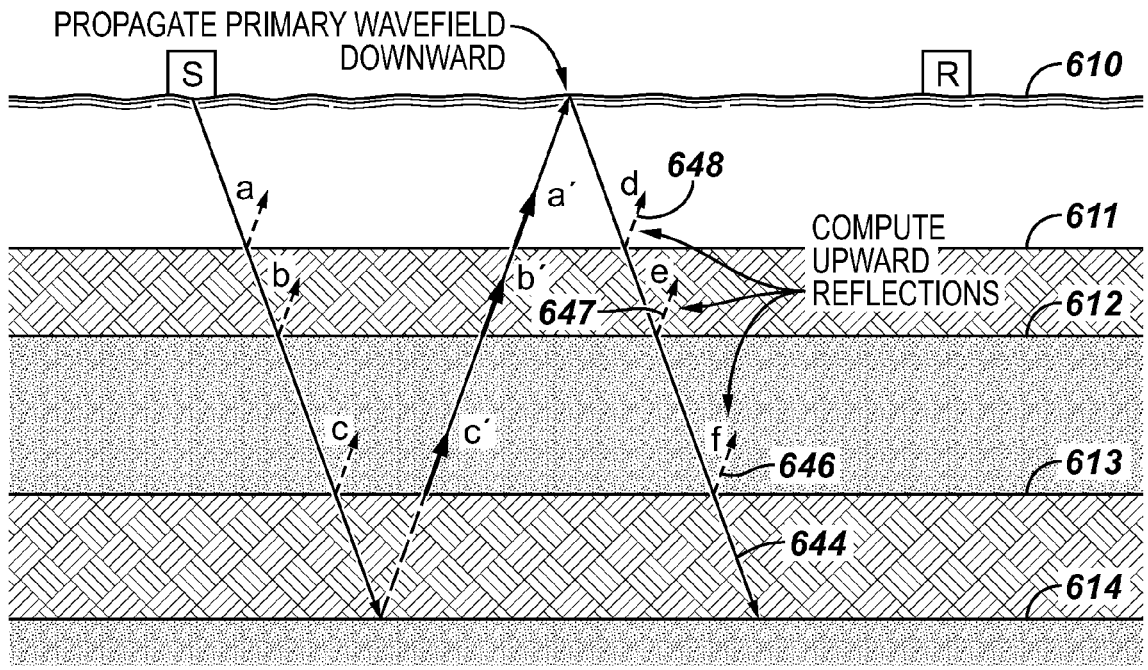
Figure 9:
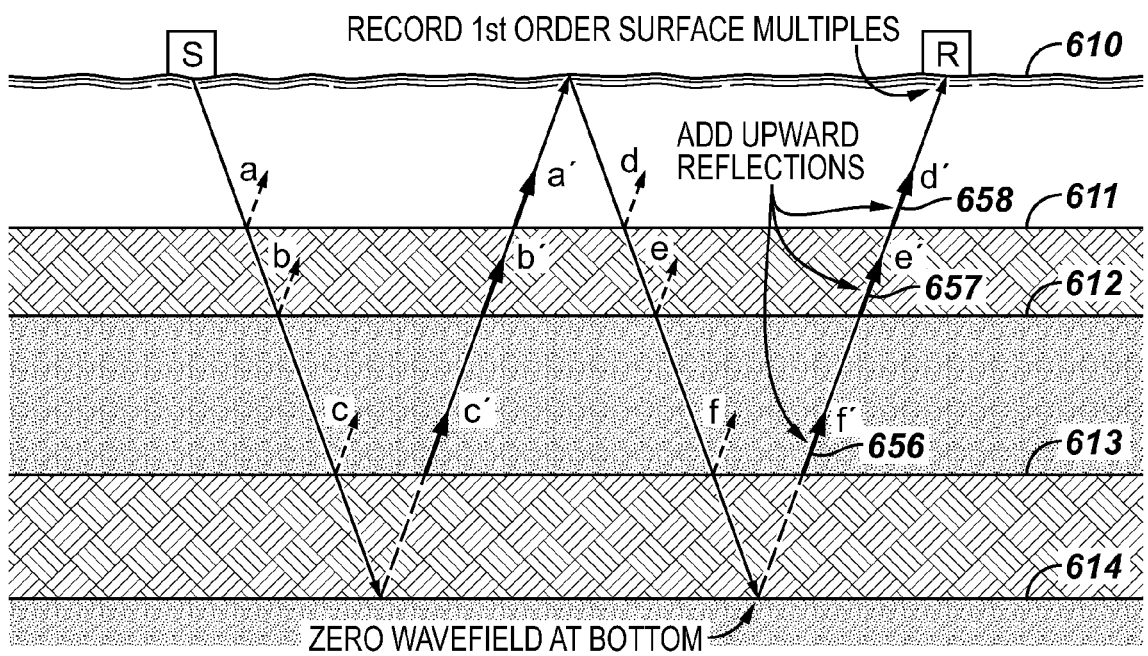

Each of the multiples depicted in FIG. 10: 1002, 1004, 1006, 1008, 1012 (a, b, c, d and e) are predicted by WEM IMP in FIG. 4: 402, 404, 408 and 412 (a, b+c, d and e). The raypaths of 1004 b and 1006 c have similar arrival times.

Higher order multiples can be similarly predicted using the WEM IMP method. FIG. 5 illustrates a result including the higher order multiples.

Similar to WEMM, WEM IMP may have four basic steps. WEM IMP may also have several optional steps. WEM IMP performs a series of downward and upward propagations through the earth model. The following four steps are performed in computing the first order internal multiples.

Basic Steps

Figure 11:
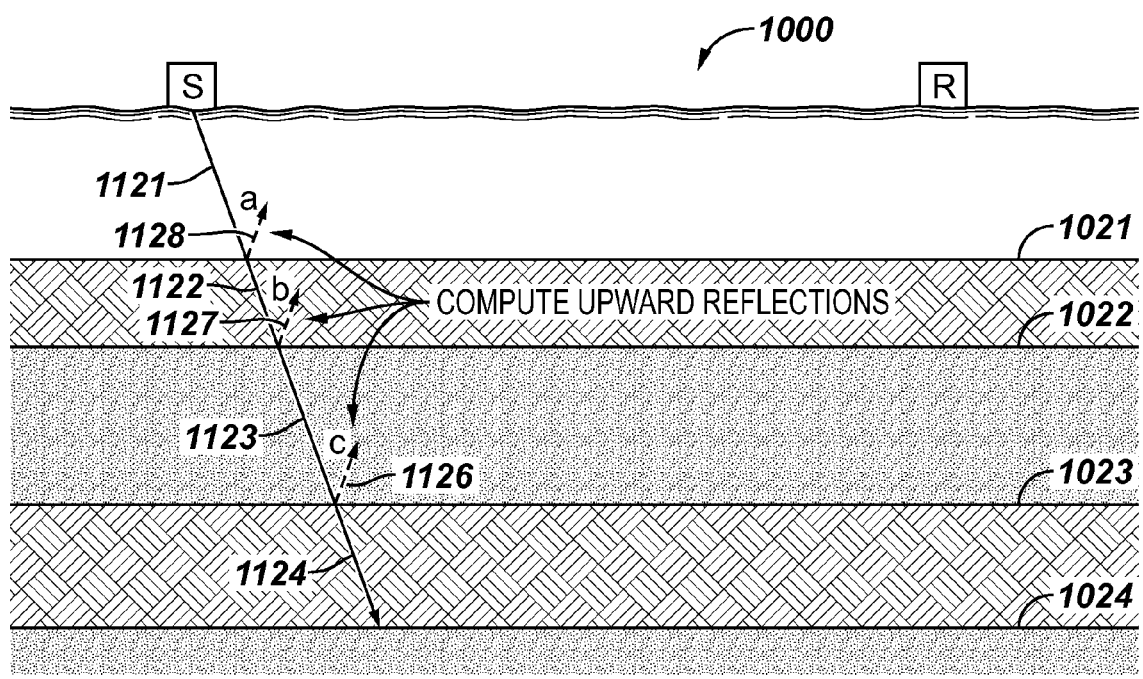
FIG. 11 illustrate a first step of an embodiment. A wavefield is generated from a point source at S, and propagated through the earth model as shown in FIG. 10. During the first downward propagation, the upward reflecting energy (a, b and c) are computed and recorded.

Step 1: Energy from a point source located at the source position S (FIG. 11) is downward propagated through the earth model 1000. As energy is propagated downward (1121, 1122, 1123 and 1124), upward reflecting energy (1126, 1127 and 1128) is computed at each reflection boundary (1021, 1022 and 1023) as illustrated in FIG. 11. These calculated energies are saved. This step is similar to the first step in WEMM.

Step 2: Once the maximum depth 1024 is reached, a 2D wavefield with zero initial energy is propagated from the bottom of the model upward. Upward reflecting energies 1236, 1237 and 1238 as shown in FIG. 12 are added to the wavefield as it is propagated upward through the earth model 1000. The wavefield recorded at the surface then contains only primary energy that has been reflected upwards.

As the wavefield is being propagated upward, downward reflecting energies 1257 and 1258 are computed at each reflection boundary 1022 and 1021 in FIG. 12. They are saved. Starting from this step, WEM IMP differs from WEMM. Since the wavefield started with zero energy, all downward reflected energies 1257 and 1258 have originated from the accumulation of energies from the upward reflections 1236, 1237 and 1238 as shown in FIG. 12.

At the bottom of the downward propagation, the wavefield is zeroed. During the first upward propagation, the previously recorded upward reflections 1126, 1127 and 1128 (a, b and c)

are added to the upward propagating wavefield 1236, 1237 and 1238 (*c'*, *b'* and *a'*), and the downward reflecting energy is computed and recorded (d and e). The final planar wavefield recorded at the surface contains only primary reflections.

Step 3: A 2D planar wavefield at the surface is propagated downward beginning with zero energy. Downward reflecting energies 1322 and 1323 (*e'* and *d'* in FIG. 13) are added to the wavefield as they are propagated downward through the earth model 1000. This accumulation of previously recorded downward reflecting energies is one of the unique processes that compute internal multiples. At the same time, upward reflecting energies 1347 and 1348 (*f* and *g* in FIG. 13) are computed at each reflection boundary 1022 and 1023, and saved.

At the surface, the wavefield is zeroed. During the second downward propagation, the upward reflecting energies 1347 and 1348 (*f* and *g* in FIG. 13) are recorded and the previously recorded downward reflections 1322 and 1323 (*e'* and *d'*) are added to the downward propagating wavefield.

Figure 14:
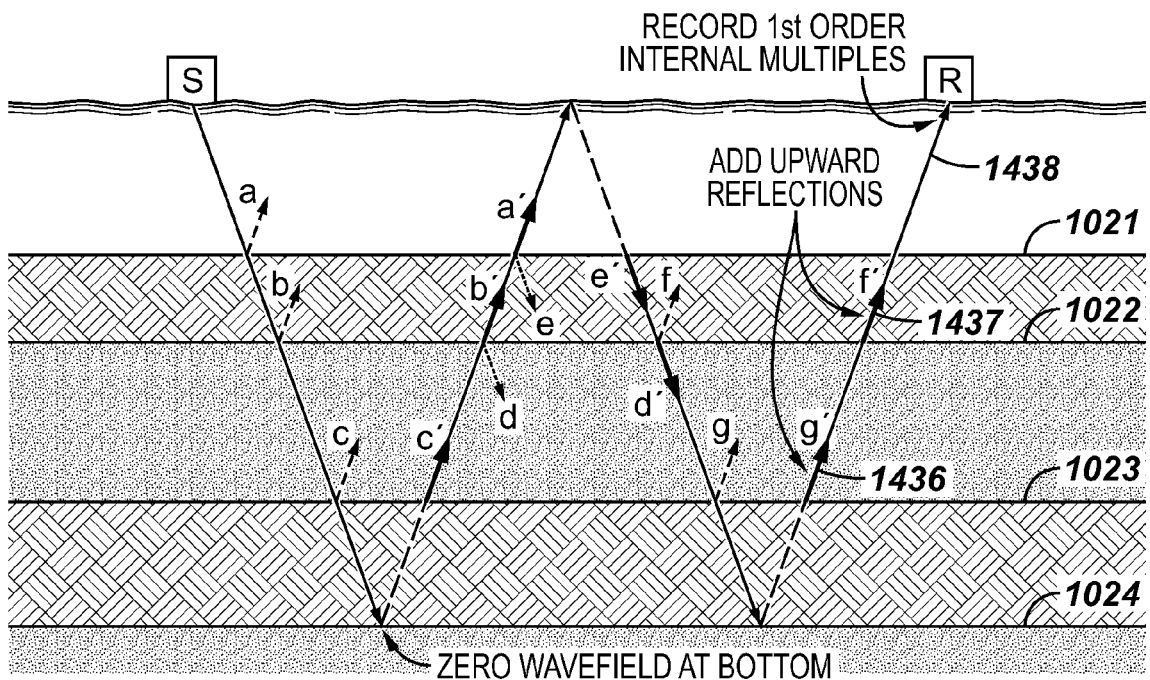
FIG. 14 illustrates a fourth step of the embodiment. For the second upward propagation, the wavefield energy at the bottom is again zeroed, and previously recorded upward reflections (f and g) are added to the upward propagating wavefield (f' and g'). The wavefield recorded at the surface receiver location (R) contains only first order internal multiples.

Step 4: The second upward propagation begins with zero energy at the bottom 1024 and accumulates the upward reflecting energies 1436 and 1437 (*g'* and *f'* in FIG. 14) that were computed and recorded during the second downward propagation (Step 3). The upward reflections contain energy accumulated only from the downward reflections 1322 and 1323 (*e'* and *d'*) recorded during the first upward propagation (Step 2), and therefore the wavefield recorded at the surface receiver position R contains only internal multiples (FIG. 14).

For the second upward propagation, the wavefield energy at the bottom 1024 is again zeroed, and previously recorded upward reflections 1347 and 1348 (*f* and *g*) are added to the upward propagating wavefield 1436 and 1437 (*f* and *g'*). The wavefield recorded at the surface receiver location (R) contains only first order internal multiples.

Using a simple four-layered earth model, one of the embodiments of the current invention is illustrated above, where only a first order internal multiple is predicted. If the model has more or less layers, then the steps may need to be adjusted accordingly without departing from the essence of the embodiment. Once the internal multiples are predicted, they can be removed during further data processing and produce multiple-free seismic data. Processed seismic data is used to identify and locate subsurface geological structures, such as reservoirs of hydrocarbon, water or other valuable materials.

Optional Step—Higher Order Multiples

Figure 15:
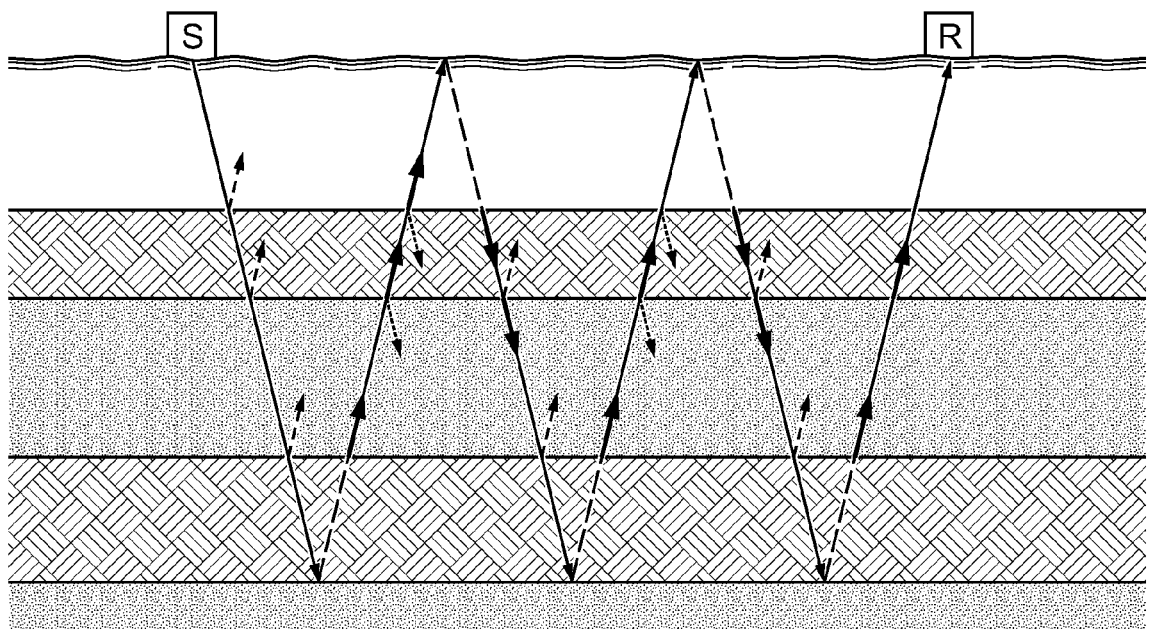
FIG. 15 illustrates an additional step of the embodiment. Any number (N) of propagations can be run to produce internal multiples of orders 1 to N−1.

If the prediction of higher order multiples is desired, the same four-step process can be used. For example, if three propagations are run, downward reflections are computed and recorded during the second upward propagation (Step 4 and FIG. 14) just as they were during the first upward propagation (Step 2 and FIG. 12), then the third propagation would proceed just as described for the second propagation (FIG. 15). In this manner, any order of internal multiples can be computed in a single job by propagating the wavefield the required number of times. All propagations work the same way, except for the first downward propagation, which does not accumulate any downward reflecting energy, and the last upward propagation, which does not compute any downward reflections (FIG. 15). With additional computation, any higher order multiples can be calculated.

Optional Step—Surface Multiples

Figure 16:
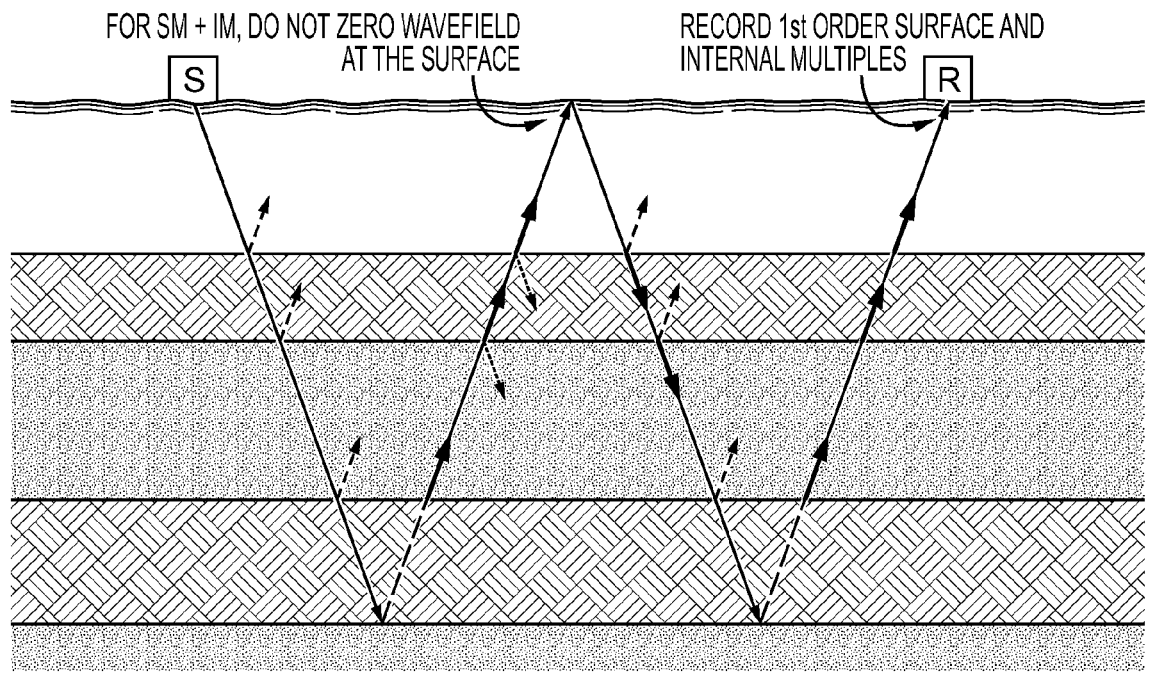
FIG. 16 illustrates another optional step. If the wavefield is not zeroed at surface, both surface multiples and internal multiples are computed.

If the wavefield is not zeroed at surface, both surface multiples and internal multiples are computed. Surface multiples can be computed in addition to internal multiples if the downward propagations (Step 3) begin with the planar wavefield recorded from the previous upward propagation (Step 2, see FIG. 16). If two propagations are run, this method computes first order surface and first order internal multiples. If N>2 propagations are run, this method computes from 1 to N−1 order surface multiples and from 1 to N−1 order internal multiples, and combinations of surface plus internal multiples, where the order of the surface multiples (I) and the order of the internal multiples (J) is I+J=N−1.

Recorded Shot as Initial Wavefield

WEM IMP does not require any input data, and the first propagation begins at a single point source. In this case, N propagations produce internal multiples of order 1 to N−1.

However, the primary wavefield (the wavefield resulting from the first down/up propagation from a point source) can be replaced with the recorded shot data.

The recorded shot contains primaries and all recorded multiples, including all orders of surface and internal multiples. When shots are input, two down/up propagations may be required to compute first order multiples. This is because the first propagation is needed to compute the downward reflections that are accumulated in the second propagation. Therefore, this method still requires N propagations to compute internal multiples of orders 1 to N−1.

Figure 17:
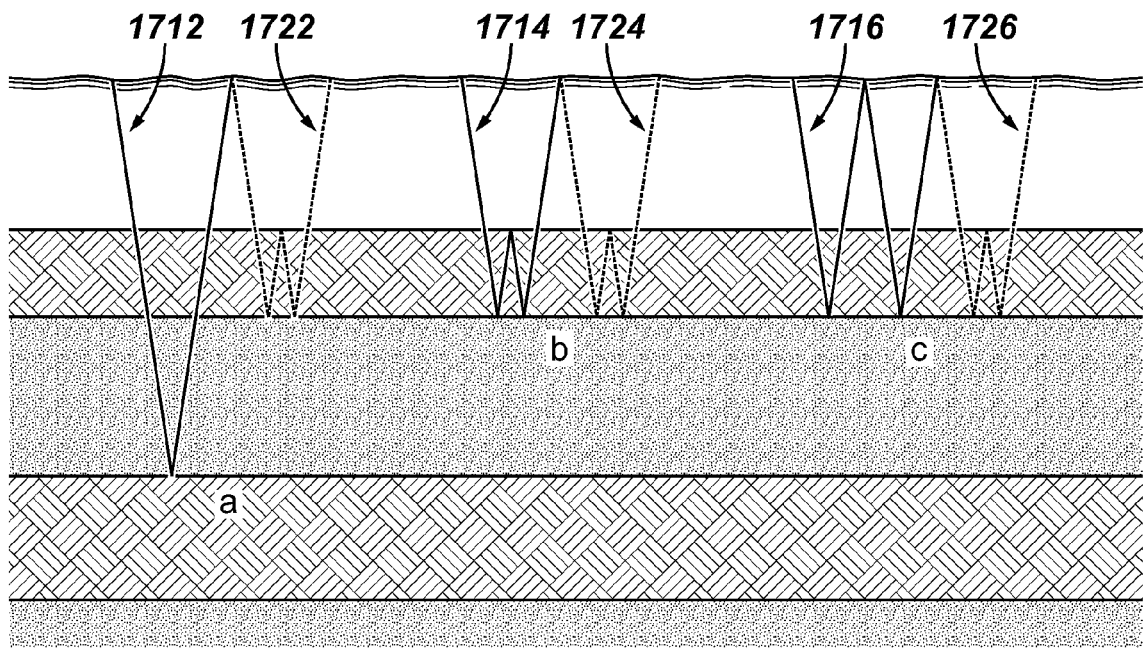
FIG. 17 illustrates combinations of the primary, surface multiples and internal multiples.

After the two down/up propagations, all events recorded by the shot have a surface multiple plus all possible first order internal multiple added to them. FIG. 17 shows a primary 1712 (*a*), a first order internal multiple 1714 (*b*), and a first order surface multiple 1716 (*c*). As shown in FIG. 17, WEM IMP is used to predict first order internal multiples (1722, 1724 and 1726). In this example, the implemented algorithm according to a method of the invention: 1) converts the primary to a first order surface multiple plus a first order internal multiple, 2) converts the first order internal multiple to a first order surface multiple plus a second order internal multiple, and 3) converts the first order surface multiple to a second order surface multiple plus a first order internal multiple. This is a more efficient way to predict higher order internal plus surface multiples.

Figure 18:
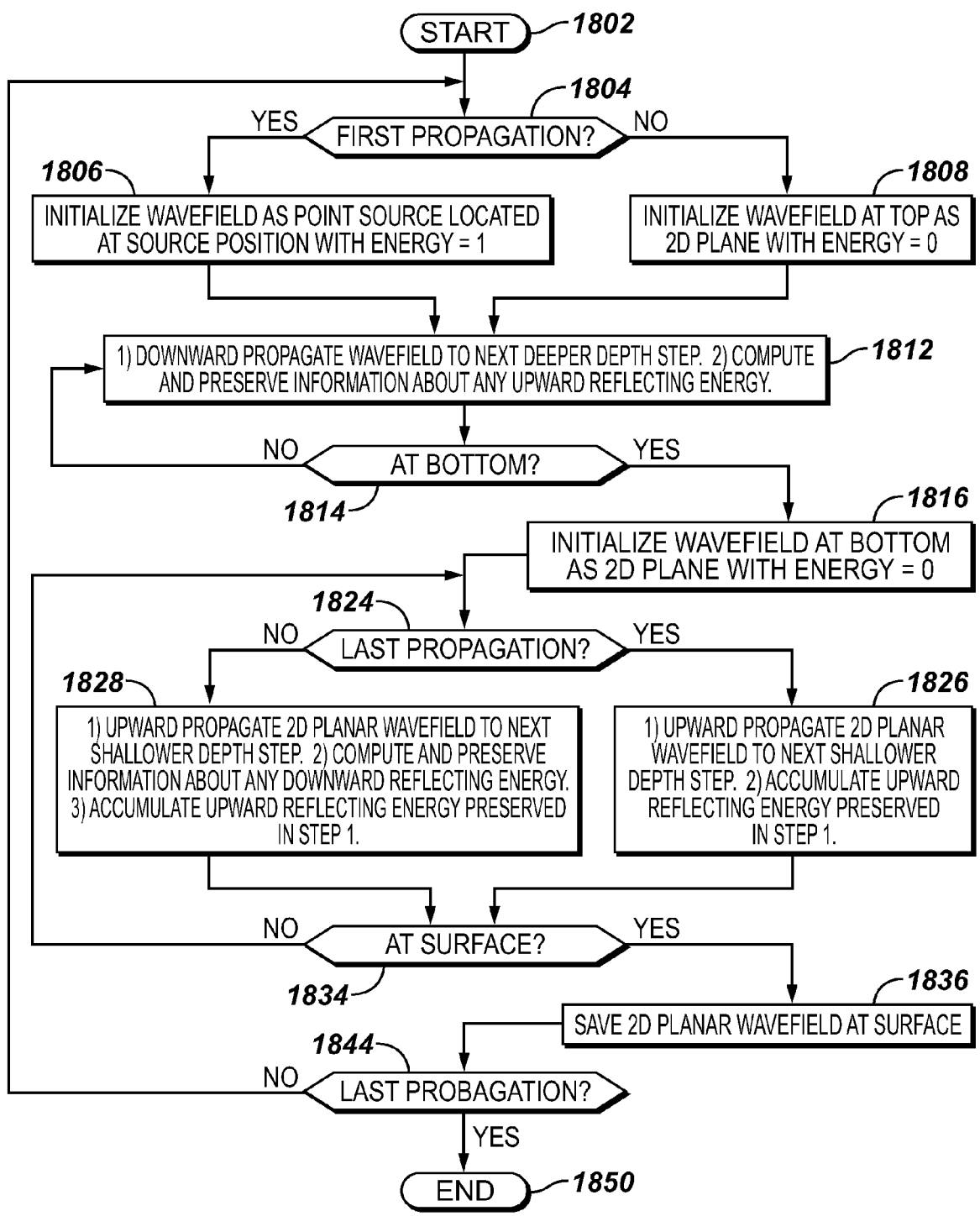
FIG. 18 illustrates a flow chart of an embodiment.

FIG. 18 illustrates a flowchart 1800 of one implementation of an embodiment. The process starts at the beginning step 1802. At step 1804, it checks whether the propagation is a first or a subsequent propagation. If it is the very first propagation, then it needs to be initialized at 1806. The wavefield as point source located at the source position is initialized with energy of 1. For subsequent propagation, the wavefield at top as 2D plane is initialized with energy at 0 in step 1808. At propagation step 1812, downward propagate the wavefield to next deeper depth step, compute and preserve information about any upward reflection energy. At step 1814, it is checked whether a bottom is reached. If not, the propagation step 1812 is repeated, until the bottom is reached. Once the bottom is reached, at step 1816, the wavefield is initialized as 2D plane with energy at 0.

At step 1824, it is checked whether the last propagation is reached. If not, then at step 1828, upward propagation is performed. The 2D plane wavefield is propagated upward to the next shallower depth step; compute and preserve information about any downward reflecting energy; and accumulate upward reflecting energy preserved in step 1806 or 1808. If last propagation has reached, then at step 1826, upward propagate 2D plane wavefield to next shallower depth step and accumulate upward reflecting energy preserved in step 1806 or 1808. No downward reflection computation is done here.

At step 1834, it is checked whether the propagation reaches the surface where the receiver is located. If no, then step 1828 or 1826 is repeated to upward propagate the wavefield to the surface. If yes, then at step 1836 save 2D plane wavefield at the surface.

At step 1844, it is checked whether the last propagation is reached. If not, then repeat propagation starting from step 1804. If yes, then it is done and stops at step 1850. The receiver now has the energies from all desired propagation paths.

Once the energies from various multiples are predicted from the above process, they can be eliminated from the seismic data during the data processing. After the data processing, where other data processing steps may also be performed to improve the data quality in various other aspects, multiple-free seismic data can be obtained. Using the improved data, geophysicists can find geological abnormalities in the subsurface structures and find possible locations for various targets they are looking for, such as hydrocarbon deposits. Based on the finding, further actions may be taken, such as drilling additional wells at the hydrocarbon deposits, changing drilling trajectories to avoid hazardous subsurface structures or increasing oil production etc.

Figure 19:
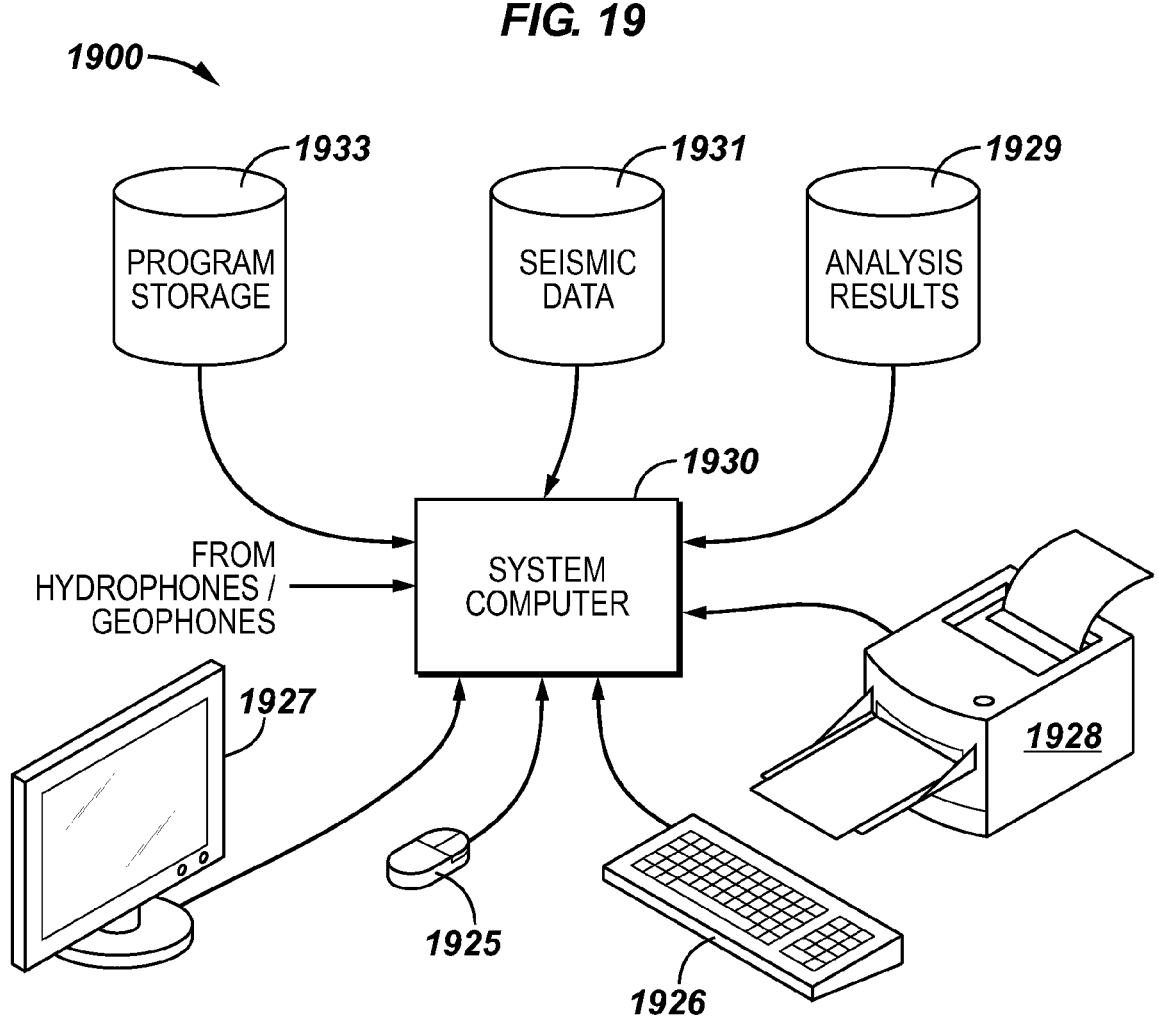
FIG. 19 illustrates a computing system, into which implementations of various techniques described herein may be implemented.

FIG. 19 illustrates a computing system 1900, into which implementations of various techniques described herein may be implemented. The computing system 1900 may include one or more system computers 1930, which may be implemented as any conventional personal computer or server. However, those skilled in the art will appreciate that implementations of various techniques described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 1930 may be in communication with disk storage devices 1929, 1931, and 1933, which may be external hard disk storage devices. It is contemplated that disk storage devices 1929, 1931, and 1933 are conventional hard disk drives, and as such, will be implemented by way of a local area network or by remote access. Of course, while disk storage devices 1929, 1931, and 1933 are illustrated as separate devices, a single disk storage device may be used to store any and all of the program instructions, measurement data, and results as desired.

In one implementation, seismic data from the receivers may be stored in disk storage device 1931. The system computer 1930 may retrieve the appropriate data from the disk storage device 1931 to process seismic data according to program instructions that correspond to implementations of various techniques described herein. The program instructions may be written in a computer programming language, such as C++, Java and the like. The program instructions may be stored in a computer-readable medium, such as program disk storage device 1933. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 1930. Combinations of any of the above may also be included within the scope of computer readable media.

In one implementation, the system computer 1930 may present output primarily onto graphics display 1927, or alternatively via printer 1928. The system computer 1930 may store the results of the methods described above on disk storage 1929, for later use and further analysis. The keyboard 19219 and the pointing device (e.g., a mouse, trackball, or the like) 1925 may be provided with the system computer 1930 to enable interactive operation.

The system computer 1930 may be located at a data center remote from the survey region. The system computer 1930 may be in communication with the receivers (either directly or via a recording unit, not shown), to receive signals indicative of the reflected seismic energy. These signals, after conventional formatting and other initial processing, may be stored by the system computer 1930 as digital data in the disk storage 1931 for subsequent retrieval and processing in the manner described above. While FIG. 19 illustrates the disk storage 1931 as directly connected to the system computer 1930, it is also contemplated that the disk storage device 1931 may be accessible through a local area network or by remote access. Furthermore, while disk storage devices 1929, 1931 are illustrated as separate devices for storing input seismic data and analysis results, the disk storage devices 1929, 1931 may be implemented within a single disk drive (either together with or separately from program disk storage device 1933), or in any other conventional manner as will be fully understood by one of skill in the art having reference to this specification.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for geophysical survey where multiple reflections in seismic surveys are attenuated by predicting such multiples using a multi-layer earth model, the method comprising:
   (a) using at least one processor to propagate a wavefield downward until reaching a bottom of the earth model, computing and preserving information about any upward reflecting energies at each layer boundary;
   (b) using at least one processor to propagate the wavefield upward from the bottom of the earth model until reaching the surface, computing and preserving information about any downward reflecting energies at each layer boundary; and
   (c) repeating step (a) and (b) at least once and accumulating upward energies towards a receiver as a prediction of multiples.

2. The method of claim 1,
   wherein in step (a), when the wavefield propagates downward and reaches the bottom, the upward reflecting energy is set to zero;
   wherein in step (b), when the wavefield propagates upward and reaches the surface, the downward reflecting energy is set to zero;
   wherein the predicted multiples include internal multiples.

3. The method of claim 1, wherein in step (a), when the wavefield propagates downward and reaches the bottom, the upward reflecting energy is set to zero;

wherein in step (b), when the wavefield propagates upward and reaches the surface, the downward reflecting energy is set to non-zero; and wherein the predicted multiples include internal multiples and surface multiples.

4. The method of claim 1, further comprising:

repeating step (a) and (b) N times and accumulating upward energies towards a receiver as a prediction of multiples of (N+1)'th order, wherein N=I+J, where I is the order of surface multiples and J is the order of internal multiples.

5. The method of claim 1, wherein propagating the wavefield downward comprises initializing an energy of the wavefield using recorded shot data at point sources.

6. The method of claim 1, wherein propagating the wavefield downward does not comprise initializing an energy of the wavefield.

7. The method of claim 1, further comprising identifying a geological structure.

8. A computer-readable non-transitory medium having stored thereon computer-executable instructions which, when executed by a computer, cause the computer to perform the following steps:

(a) propagating a wavefield downward until reaching a bottom of the earth model, computing and preserving information about any upward reflecting energies at each layer boundary;

(b) propagating the wavefield upward from the bottom of the earth model until reaching the surface, computing and preserving information about any downward reflecting energies at each layer boundary; and (c) repeating step (a) and (b) at least once and accumulating upward energies towards a receiver as a prediction of multiples.

9. The computer-readable medium of claim 8, wherein in step (a), when the wavefield propagates downward and reaches the bottom, the upward reflecting energy is set to zero;

wherein in step (b), when the wavefield propagates upward and reaches the surface, the downward reflecting energy is set to zero;

wherein the predicted multiples include internal multiples.

10. The computer-readable medium of claim 8, wherein in step (a), when the wavefield propagates downward and reaches the bottom, the upward reflecting energy is set to zero;

wherein in step (b), when the wavefield propagates upward and reaches the surface, the downward reflecting energy is set to non-zero; and wherein the predicted multiples include internal multiples and surface multiples.

11. The computer-readable medium of claim 8, further comprising:

repeating step (a) and (b) N times and accumulating upward energies towards a receiver as a prediction of multiples of (N+1)'th order, wherein N=I+J, where I is the order of surface multiples and J is the order of internal multiples.

12. The computer-readable medium of claim 8, wherein the instructions when executed by the computer cause the computer to initialize an energy of the wavefield before downward propagation using recorded shot data at point sources.

13. The computer-readable medium of claim 8, wherein the instructions when executed by the computer cause the computer to not initialize the energy of propagation of the wavefield before downward propagation.

14. A seismic data processing system comprising:

a processor; and a storage medium having stored thereon computer-executable instructions which, when executed by the processor, cause the system to perform the following steps:

(a) propagating a wavefield downward until reaching a bottom of the earth model, computing and preserving information about any upward reflecting energies at each layer boundary;

(b) propagating the wavefield upward from the bottom of the earth model until reaching the surface, computing and preserving information about any downward reflecting energies at each layer boundary; and (c) repeating step (a) and (b) at least once and accumulating upward energies towards a receiver as a prediction of multiples.

15. The system of claim 14, wherein in step (a), when the wavefield propagates downward and reaches the bottom, the upward reflecting energy is set to zero;

wherein in step (b), when the wavefield propagates upward and reaches the surface, the downward reflecting energy is set to zero;

wherein the predicted multiples include internal multiples.

16. The system of claim 14, wherein in step (a), when the wavefield propagates downward and reaches the bottom, the upward reflecting energy is set to zero;

wherein in step (b), when the wavefield propagates upward and reaches the surface, the downward reflecting energy is set to non-zero; and wherein the predicted multiples include internal multiples and surface multiples.

17. The system of claim 14, where in the steps further comprising:

repeating step (a) and (b) N times and accumulating upward energies towards a receiver as a prediction of multiples of (N+1)'th order, wherein N=I+J, where I is the order of surface multiples and J is the order of internal multiples.

18. The system of claim 14, wherein propagating the wavefield downward comprises initializing an energy of the wavefield using recorded shot data at point sources.

19. The system of claim 14, wherein propagating the wavefield downward does not comprise initializing an energy of the wavefield.

* * * * *